US012696883B2

(12) United States Patent
Mi et al.

(10) Patent No.: US 12,696,883 B2
(45) Date of Patent: Aug. 4, 2026

(54) CLEANING DEVICE AND METHOD FOR TILAPIA FARMING POND

(71) Applicant: TONGWEI AGRICULTURAL DEVELOPMENT CO., LTD., Chengdu (CN)

(72) Inventors: Haifeng Mi, Chengdu (CN); Tao Teng, Chengdu (CN); Lu Zhang, Chengdu (CN); Mingchun Ren, Chengdu (CN); Chunyu Xue, Chengdu (CN); Heng Yin, Chengdu (CN); Hualiang Liang, Chengdu (CN)

(73) Assignee: TONGWEI AGRICULTURAL DEVELOPMENT CO., LTD., Chengdu (CN)

( * ) Notice: Subject to any disclaimer, the term of this patent is extended or adjusted under 35 U.S.C. 154(b) by 34 days.

(21) Appl. No.: 18/817,277

(22) Filed: Aug. 28, 2024

(65) Prior Publication Data

US 2025/0221389 A1 Jul. 10, 2025

(30) Foreign Application Priority Data

Jan. 5, 2024 (CN) ......................... 202410022470.1

(51) Int. Cl.
*A01K 63/10* (2017.01)
(52) U.S. Cl.
CPC .................................... *A01K 63/10* (2017.01)
(58) Field of Classification Search
CPC ......... A01K 63/10; E04H 4/16; A47L 23/263; B08B 1/00; B08B 1/10; B08B 3/04
USPC ....................................................... 15/1, 1.7
See application file for complete search history.

(56) References Cited

U.S. PATENT DOCUMENTS

| | | | | | |
|---|---|---|---|---|---|
| 7,051,393 | B2 * | 5/2006 | Cox | ........................... | A61L 2/18 |
| | | | | | 15/36 |
| 8,931,134 | B2 * | 1/2015 | Jefferson | ................... | F26B 5/16 |
| | | | | | 15/310 |
| 2018/0242726 | A1 * | 8/2018 | Lindgren | ............... | A01K 63/10 |

FOREIGN PATENT DOCUMENTS

| | | | | | |
|---|---|---|---|---|---|
| BR | 112016024021 | B1 * | 1/2022 | ........... | E02F 3/8866 |
| CN | 85201611 | U * | 12/1986 | | |
| CN | 201718430 | U * | 1/2011 | | |
| CN | 201908271 | U * | 7/2011 | | |
| CN | 107130573 | A * | 9/2017 | ........... | E02B 15/104 |
| CN | 107879404 | A * | 4/2018 | ................ | C02F 1/00 |
| CN | 108661026 | A * | 10/2018 | ............. | E02B 15/10 |

(Continued)

*Primary Examiner* — Marisa V Conlon
*Assistant Examiner* — Hae Rie Jessica Byun
(74) *Attorney, Agent, or Firm* — Bayramoglu Law Offices LLC

(57) ABSTRACT

A cleaning device and method for a tilapia farming pond solves the problems of the existing pond cleaning device that cannot rotate the bait and feces collection plate without affecting tilapia and cannot achieve automatic lateral squeezing and discharge of bait and feces at the same time of collecting the bait and feces. The cleaning device includes a collection box. Activated carbon plates are rotatably provided in the collection box. An outer side of the collection box is surrounded by a pond body, a left side of the collection box is fixedly provided with a waterproof motor, and a back side of the collection box is provided with a cleaning assembly. A rope channel is provided in the collection box; a traction steel rope is provided in the rope channel. An end of the traction steel rope is guided by a guide wheel and connected to a push plate.

10 Claims, 8 Drawing Sheets

(56)　　　　　　　References Cited

FOREIGN PATENT DOCUMENTS

| | | | | |
|---|---|---|---|---|
| CN | 108930300 A | * | 12/2018 | ................ E02F 5/28 |
| CN | 109371946 A | * | 2/2019 | ........... E02B 15/104 |
| CN | 112106726 A | * | 12/2020 | ............ A01K 63/10 |
| CN | 112726542 A | * | 4/2021 | ............ E02B 15/10 |
| CN | 110965537 B | | 8/2021 | |
| CN | 114246154 A | * | 3/2022 | ............ A01K 63/04 |
| CN | 216340034 U | * | 4/2022 | |
| CN | 218571188 U | * | 3/2023 | |
| CN | 116369044 A | * | 7/2023 | ............ B60F 3/0061 |
| CN | 219578110 U | * | 8/2023 | |
| CN | 219781291 U | * | 10/2023 | |
| CN | 119877624 A | * | 4/2025 | ............ C02F 11/121 |
| DE | 202014103771 U1 | * | 8/2014 | ............ A01K 63/003 |
| NO | 20210983 A1 | * | 2/2023 | ........... B62D 55/265 |
| SE | 511870 C2 | * | 12/1999 | ........... B01D 24/205 |

* cited by examiner

403

404

1

2          A          3          13          8

401

1

403

404

CLEANING DEVICE AND METHOD FOR TILAPIA FARMING POND

CROSS REFERENCE TO THE RELATED APPLICATIONS

This application is based upon and claims priority to Chinese Patent Application No. 202410022470.1, filed on Jan. 5, 2024, the entire contents of which are incorporated herein by reference.

TECHNICAL FIELD

The present disclosure relates to the technical field of tilapia farming, and in particular to a cleaning device and method for a tilapia farming pond.

BACKGROUND

As a tropical fish, tilapia has strong adaptability, strong reproductive ability, and a strong ability to fight for food. Tilapia grows rapidly, has few bones and tender and delicious meat, and is rich in nutrients. Therefore, it is loved by consumers and has become an important economic fish in the world. In China, with the development of intensive aquaculture models, the stocking density of tilapia is increasing, and the feeding amount during high temperature seasons is large, leading to frequent occurrence of various diseases. For example, tilapia often suffers from enteritis, which results in "trailing feces" in tilapia's anus, causing a large amount of white flocculent feces to appear around the feeding machine and in the downwind area of the fish pond. If fish feces are not cleaned up in a timely manner, they will continue to pollute the water and lead to the continuous occurrence of fish diseases. Therefore, it is necessary to promptly and continuously clean the fish feces, but the existing pond cleaning devices still have some defects in use. For example, Chinese patent application CN110965537B discloses a water surface cleaning device for freshwater fish farming. In this disclosure, a fishing box is dragged on the water surface, allowing a fishing net to fish garbage on the water surface within its moving range in a centralized manner, and a support rod is pulled up to remove the garbage in a centralized manner. A reinforcement rod cooperates with a first fixed rod to disperse the shear stress on the first fixed rod, thereby reducing the breaking possibility of the first fixed rod and improving the structural stability of the support rod. A reset spring supports a positioning element to tightly connect a positioning protruding rod to a positioning hole, thereby ensuring relative structural stability between an adjustment rod and a grip rod. When in use, the water surface cleaning device can disperse the shear stress, but it cannot be placed as a whole at the bottom of the pond to perform cleaning. In addition, the water surface cleaning device cannot achieve automatic collection and cleaning of bait and tilapia's feces, and cannot achieve automatic lateral squeezing and discharge of bait and feces at the same time of collection, resulting in poor functionality. Furthermore, when in use, the existing pond cleaning device is unable to rotate the bait and feces collection plate without affecting tilapia.

SUMMARY

The present disclosure proposes a cleaning device and method for a tilapia farming pond. The present disclosure solves the problems of the existing pond cleaning device that cannot rotate the bait and feces collection plate without affecting tilapia and cannot achieve automatic lateral squeezing and discharge of bait and feces at the same time of collecting the bait and feces.

The present disclosure adopts the following technical solutions.

A cleaning device for a tilapia farming pond includes a collection box, where activated carbon plates are rotatably provided in the collection box; an outer side of the collection box is surrounded by a pond body, a left side of the collection box is fixedly provided with a waterproof motor, and a back side of the collection box is provided with a cleaning assembly; a rope channel is provided in the collection box; a traction steel rope is provided in the rope channel; an end of the traction steel rope is guided by a guide wheel and connected to a push plate; the guide wheel is fixedly connected to the pond body; the push plate is slidably connected to the collection box; a discharge port is provided at a right side of the collection box, and an outlet is provided at a right side of the pond body; a blanking cap is provided in the outlet; a front end of each of the activated carbon plates is fixedly connected to a synchronous wheel; a front end of a leftmost synchronous wheel is fixedly connected to a gear; a lower side of the gear is meshed with a rack; a moving groove for the rack to move is provided in the collection box; a left side of the rack is fixedly connected to a movable plate; a lower right side of the movable plate is fixedly connected to an electric push rod; the electric push rod is fixedly connected to the collection box; and the synchronous wheel is connected to an adjacent synchronous wheel through a synchronous belt.

In a preferred solution of the present disclosure, the activated carbon plates are evenly spaced in the collection box; and each two adjacent activated carbon plates are separated by a gap.

In a preferred solution of the present disclosure, the cleaning assembly includes a scraper sleeve attached to the back side of the collection box; a left side of the scraper sleeve is fixedly connected to a slider; an upper left side of the slider is fixedly connected to a limiting element; a front end of the slider is fixedly connected to a wedge element; the left side of the collection box is provided with a guide groove for the limiting element to move; an output shaft of the waterproof motor is fixedly connected to a screw rod; and the screw rod is threaded with the limiting element and rotatably connected to the collection box.

In a preferred solution of the present disclosure, the scraper sleeve is made of rubber; and the scraper sleeve, the slider, the limiting element, and the wedge element are integrated into a whole.

In a preferred solution of the present disclosure, the scraper sleeve forms a first sliding structure with the collection box through the slider, the limiting element and the screw rod; and a front surface of the scraper sleeve is flush with front surfaces of the slider and the limiting element.

In a preferred solution of the present disclosure, the wedge element is a right-angled triangular prism; a height of the wedge element is identical to a height of the slider; and an inclined surface of the wedge element is located at a side adjacent to the scraper sleeve.

In a preferred solution of the present disclosure, the traction steel rope is winded around a surface of the screw rod; the push plate forms a second sliding structure with the collection box through the screw rod and the traction steel rope; a rotating ring is rotatably provided on the surface of the screw rod; a surface of the rotating ring is bolted with an elastic rope; and a right side of the elastic rope is connected to the push plate.

In a preferred solution of the present disclosure, the gear and the synchronous wheel form a rotating structure with the collection box through the rack; and the activated carbon plate forms a synchronous rotating structure with an adjacent activated carbon plate through the synchronous wheel and the synchronous belt.

In a preferred solution of the present disclosure, a position of the outlet corresponds to a position of the discharge port, and a size of the discharge port is identical to a size of the outlet.

A cleaning method for a tilapia farming pond includes the following steps:

S1: placing the collection box at a bottom of the pond body; collecting, by the activated carbon plates evenly spaced on a surface of the collection box, bait and feces produced during tilapia farming; and driving, by shortening the electric push rod, the movable plate to move to the right, such that the rack of the device drives the gear to rotate counterclockwise, the gear drives the leftmost synchronous wheel to rotate, and the leftmost synchronous wheel drives a leftmost activated carbon plate to rotate 180° counterclockwise;

S2: driving, by the synchronous belt, the synchronous wheels at all positions to rotate synchronously when the leftmost activated carbon plate rotates, such that the activated carbon plates of the device at all positions rotate synchronously, thereby achieving cleaning of tilapia feces and bait on the surfaces of the activated carbon plates, where during a process of cleaning the bait, tilapia is prevented from entering the collection box, ensuring safety of the device when in use; and S3: driving, by the waterproof motor, the cleaning assembly to work, allowing the cleaning assembly to clean the surfaces of the flipped activated carbon plates; winding the loose traction steel rope when the activated carbon plates of the device move, such that the traction steel rope pulls the push plate to the right under the guidance of the guide wheel; moving, after the scraper sleeve moves forward a certain distance, the push plate to the right to thoroughly clean the tilapia feces and bait pushed forward, such that the tilapia feces and bait are pushed into the discharge port and the outlet; and finally, removing the blanking cap of the device to perform squeezing cleaning on the tilapia feces and bait.

The working principle and beneficial effects of the present disclosure are as follows:

1. Through the collection box and the rotatably provided activated carbon plates, the device can collect the tilapia bait and feces from the bottom of the pond through the activated carbon plates. Compared to the existing fishing cleaning device, the device of the present disclosure does not affect the environment inside the pond during the collection process, improving its practicality and overcoming the shortcoming of the existing cleaning device that cannot be placed as a whole at the bottom of the pond for cleaning work. Therefore, the device of the present disclosure has the advantage of better usability.

2. The device is provided with a cleaning assembly and a waterproof motor. The waterproof motor drives the screw rod to rotate. When the screw rod rotates, the slider moves straight forward and backward, thereby driving the rubber scraper sleeve to move forward and backward. The rotatably provided activated carbon plates at all positions do not affect the environment inside the pond, and are coordinated with the forward and backward movement of the rubber scraper sleeve to facilitate the cleaning on the surfaces of the activated carbon plates of the device. Compared to the existing fishing cleaning device, the device of the present disclosure overcomes the shortcoming of the existing pond cleaning device that cannot rotate the bait and feces collection plate without affecting tilapia. Therefore, the device of the present disclosure has the advantage of stronger functionality.

3. Through the traction steel rope and the guide wheel, the screw rod of the device gradually winds the loose traction steel rope as it rotates. When the scraper sleeve moves forward to a certain extent, the push plate is pulled to the right by the traction steel rope, achieving automatic squeezing cleaning of the bait and feces, improving the functionality of the device. The device of the present disclosure overcomes the shortcoming of the existing pond cleaning device that cannot achieve automatic lateral squeezing and discharge of bait and feces at the same time of collecting the bait and feces. Therefore, the device of the present disclosure has the advantage of higher cleaning efficiency.

4. Through the rotating ring and the elastic rope, the screw rod will not wind the elastic rope when it rotates. Subsequently, when the screw rod rotates in reverse to reset the scraper sleeve, the elastic rope drives the push plate used for lateral squeezing to automatically reset, improving the convenience of the device's use.

BRIEF DESCRIPTION OF THE DRAWINGS

The present disclosure is described in further detail below with reference to the drawings and specific implementations.

Figure 1:
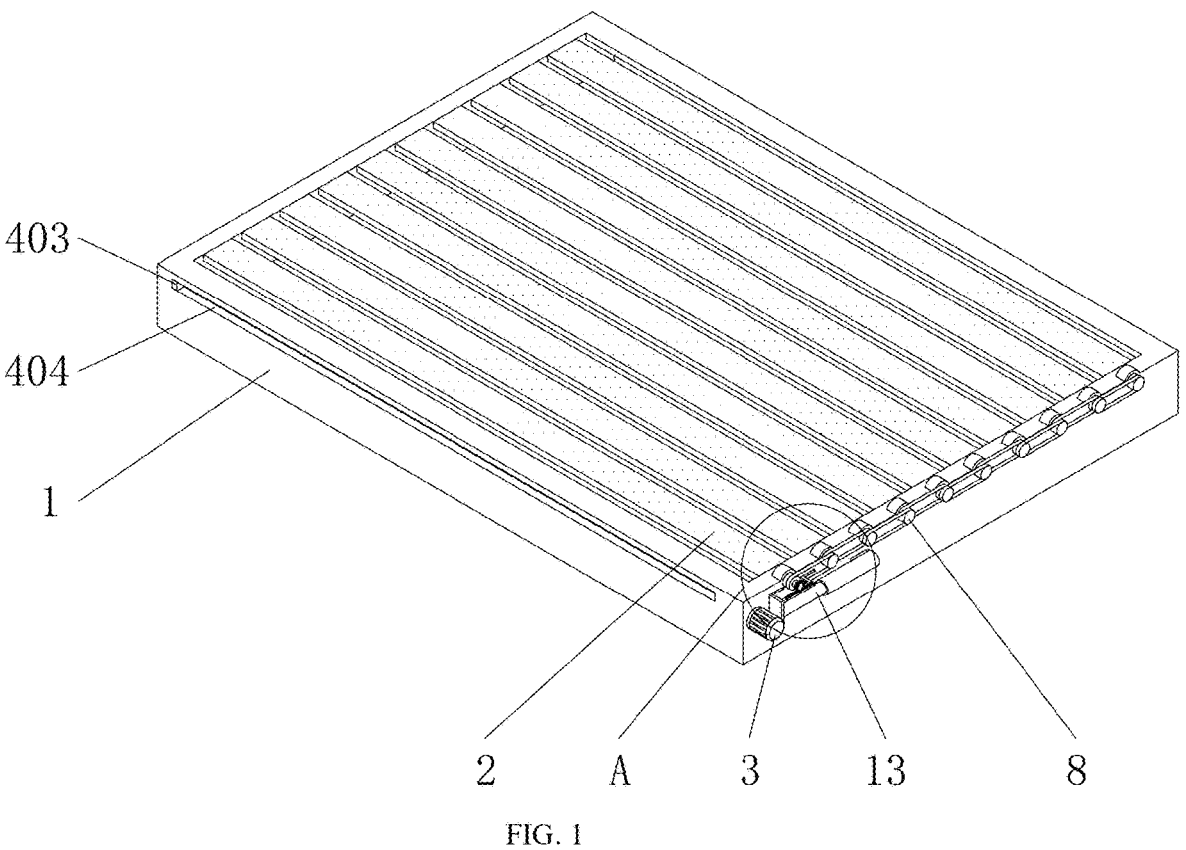
FIG. 1 is an overall structural diagram of a cleaning device for a tilapia farming pond according to the present disclosure.

Reference Numerals: 1. collection box; 2. activated carbon plate; 3. waterproof motor; 4 cleaning assembly; 401. scraper sleeve; 402. slider; 403. limiting element; 404. guide groove; 405. wedge element; 406. screw rod; 5. traction steel rope; 6. discharge port; 7. push plate; 8. synchronous wheel; 9. synchronous belt; 10. gear; 11. rack; 12. movable plate; 13. electric push rod; 14. moving groove; 15. elastic rope; 16. rope channel; 17. guide wheel; 18. pond body; 19. outlet; 20. blanking cap; and 21. rotating ring.

DETAILED DESCRIPTION OF THE EMBODIMENTS

The following clearly and completely describes the technical solutions in the embodiments of the present disclosure with reference to the embodiments of the present disclosure.

Apparently, the described embodiments are merely a part rather than all of the embodiments of the present disclosure. All other embodiments obtained by those of ordinary skill in the art based on the embodiments of the present disclosure without creative efforts should fall within the protection scope of the present disclosure.

Embodiment 1

As shown in FIGS. 1 to 8, a cleaning device for a tilapia farming pond includes collection box 1. Activated carbon plates 2 are rotatably provided in the collection box 1. An outer side of the collection box 1 is surrounded by pond body 18. The collection box 1 is located at a bottom of the pond body 18 to collect tilapia bait and feces. Compared to fishing cleaning of feces, this device cleans and collects feces without affecting the environment inside the pond. Waterproof motor 3 is fixed to a left side of the collection box 1, and cleaning assembly 4 is fixed to a back side of the collection box 1. Rope channel 16 is provided in the collection box 1. Traction steel rope 5 is provided in the rope channel 16. An end of the traction steel rope 5 is guided by guide wheel 17 and connected to push plate 7. The guide wheel 17 is fixedly connected to the pond body 18. The push plate 7 is slidably connected to the collection box 1. Discharge port 6 is provided at a right side of the collection box 1, and outlet 19 is provided at a right side of the pond body 18. Blanking cap 20 is provided in the outlet 19. When the push plate 7 pushes the tilapia bait and feces to the outlet 19, the blanking cap 20 is removed to collect the pushed tilapia bait and feces. A front end of each of the activated carbon plates 2 is fixedly connected to synchronous wheel 8. A front end of leftmost synchronous wheel 8 is fixedly connected to gear 10. A lower side of the gear 10 is meshed with rack 11. Moving groove 14 for the rack 11 to move is provided in the collection box 1. A left side of the rack 11 is fixedly connected to movable plate 12. A lower right side of the movable plate 12 is fixedly connected to electric push rod 13. The electric push rod 13 is fixedly connected to the collection box 1. The synchronous wheel 8 is connected to adjacent synchronous wheel 8 through synchronous belt 9. When leftmost activated carbon plate 2 rotates through the synchronous wheel 8, the remaining activated carbon plates 2 rotate synchronously, such that surfaces of the activated carbon plates 2 are scraped off by the cleaning assembly 4 subsequently. When the cleaning assembly 4 is working, the traction steel rope 5 pulls the push plate 7 to move to the right, such that the tilapia bait and feces are pushed by the push plate 7 to the right of the device for collection. In this way, the device achieves automatic lateral squeezing and discharge of the bait and feces at the same time of collecting the bait and feces.

Embodiment 2

As shown in FIGS. 1 to 8, based on the same concept as Embodiment 1, this embodiment proposes another cleaning device for a tilapia farming pond.

In this embodiment, the activated carbon plates 2 are evenly spaced in the collection box 1. Each two adjacent activated carbon plates 2 are separated by a gap to avoid motion interference between the activated carbon plates 2 at different positions during rotation. The design ensures the stability of the device's operation, minimizes the adverse effects of the rotation of the activated carbon plates 2 on tilapia, and ensures both the fecal collection function and safe use.

In this embodiment, the cleaning assembly 4 includes scraper sleeve 401 attached to the back side of the collection box 1. A left side of the scraper sleeve 401 is fixedly connected to slider 402. An upper left side of the slider 402 is fixedly connected to limiting element 403. A front end of the slider 402 is fixedly connected to wedge element 405. The left side of the collection box 1 is provided with guide groove 404 for the limiting element 403 to move. An output shaft of the waterproof motor 3 is fixedly connected to screw rod 406. The screw rod 406 is threaded with the limiting element 403. The screw rod 406 is rotatably connected to the collection box 1. The waterproof motor 3 drives the screw rod 406 to rotate, causing the slider 402 to move straight forward under the limiting action of the limiting element 403 and the guide groove 404. When the slider 402 moves, the scraper sleeve 401 performs a scraping cleaning operation. The design ensures the overall functionality of the device. In this embodiment, the scraper sleeve 401 is made of rubber. The scraper sleeve 401, the slider 402, the limiting element 403, and the wedge element 405 are integrated into a whole. Through the rubber scraper sleeve 401, the device deforms when squeezed and then resets, improving its applicability and overall cleaning effect, while ensuring the normal operation of the scraper sleeve 401.

In this embodiment, the scraper sleeve 401 forms a first sliding structure with the collection box 1 through the slider 402, the limiting element 403 and the screw rod 406. A front surface of the scraper sleeve 401 is flush with front surfaces of the slider 402 and the limiting element 403. When the screw rod 406 rotates, it drives the scraper sleeve 401 to slide back and forth, thereby efficiently cleaning the attached tilapia bait and feces, improving the practicality of the device.

In this embodiment, the wedge element 405 is a right-angled triangular prism. A height of the wedge element 405 is identical to a height of the slider 402. An inclined surface of the wedge element 405 is located at a side adjacent to the scraper sleeve 401. When the wedge element 405 moves, it utilizes the inclined surface to move impurities in the area, thereby achieving automatic discharge and ensuring the durability of the device.

In this embodiment, the traction steel rope 5 is winded around a surface of the screw rod 406. The push plate 7 forms a second sliding structure with the collection box 1 through the screw rod 406 and the traction steel rope 5. Rotating ring 21 is rotatably provided on the surface of the screw rod 406. A surface of the rotating ring 21 is bolted with elastic rope 15. A right side of the elastic rope 15 is connected to the push plate 7. The loose traction steel rope 5 pulls the push plate 7 after rotating through the screw rod 406 for a period of time, such that the device automatically laterally pushes out the scraped fish feces and bait after the cleaning work is completed, improving the functionality of the device.

Figure 2:
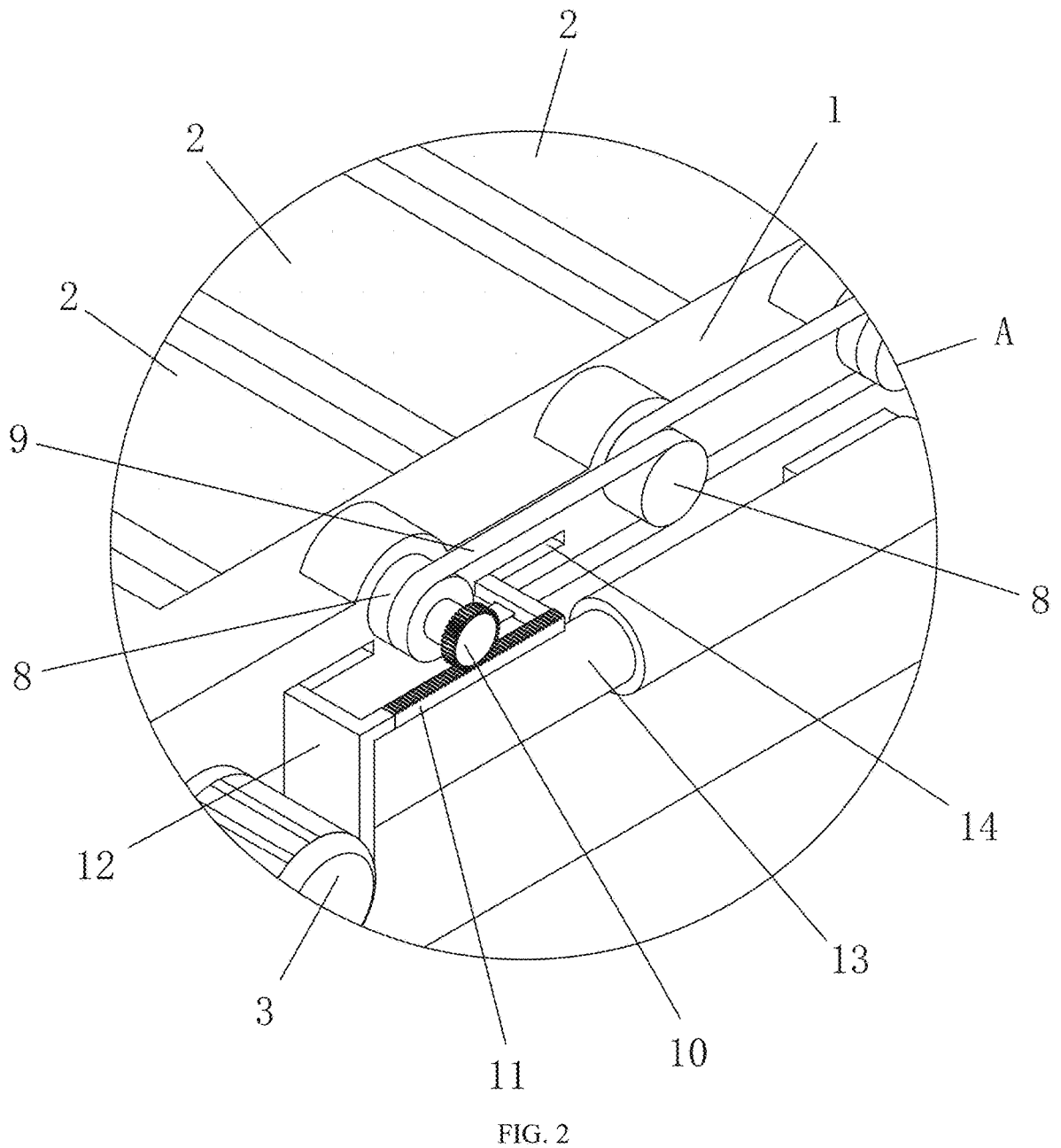
FIG. 2 is an enlarged view of A shown in FIG. 1.
Figure 3:
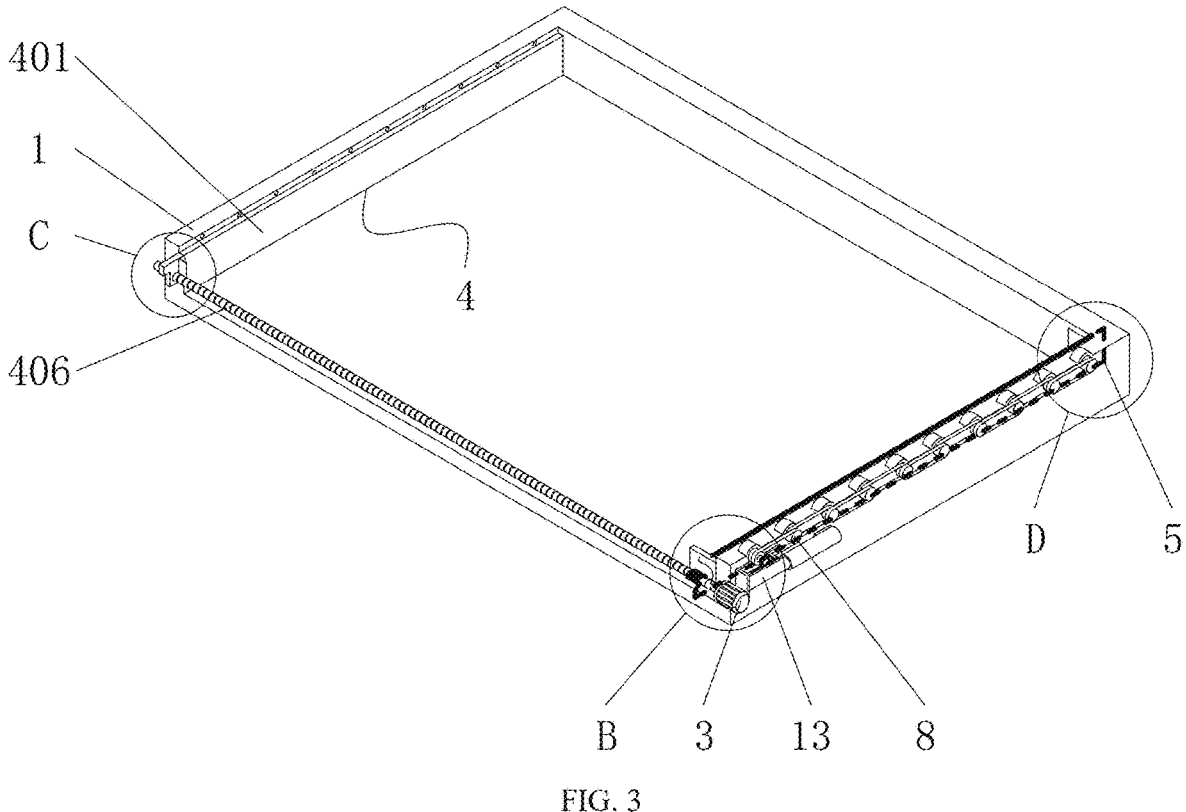
FIG. 3 is a structure diagram of a collection box and a cleaning assembly that are connected according to the present disclosure.
Figure 4:
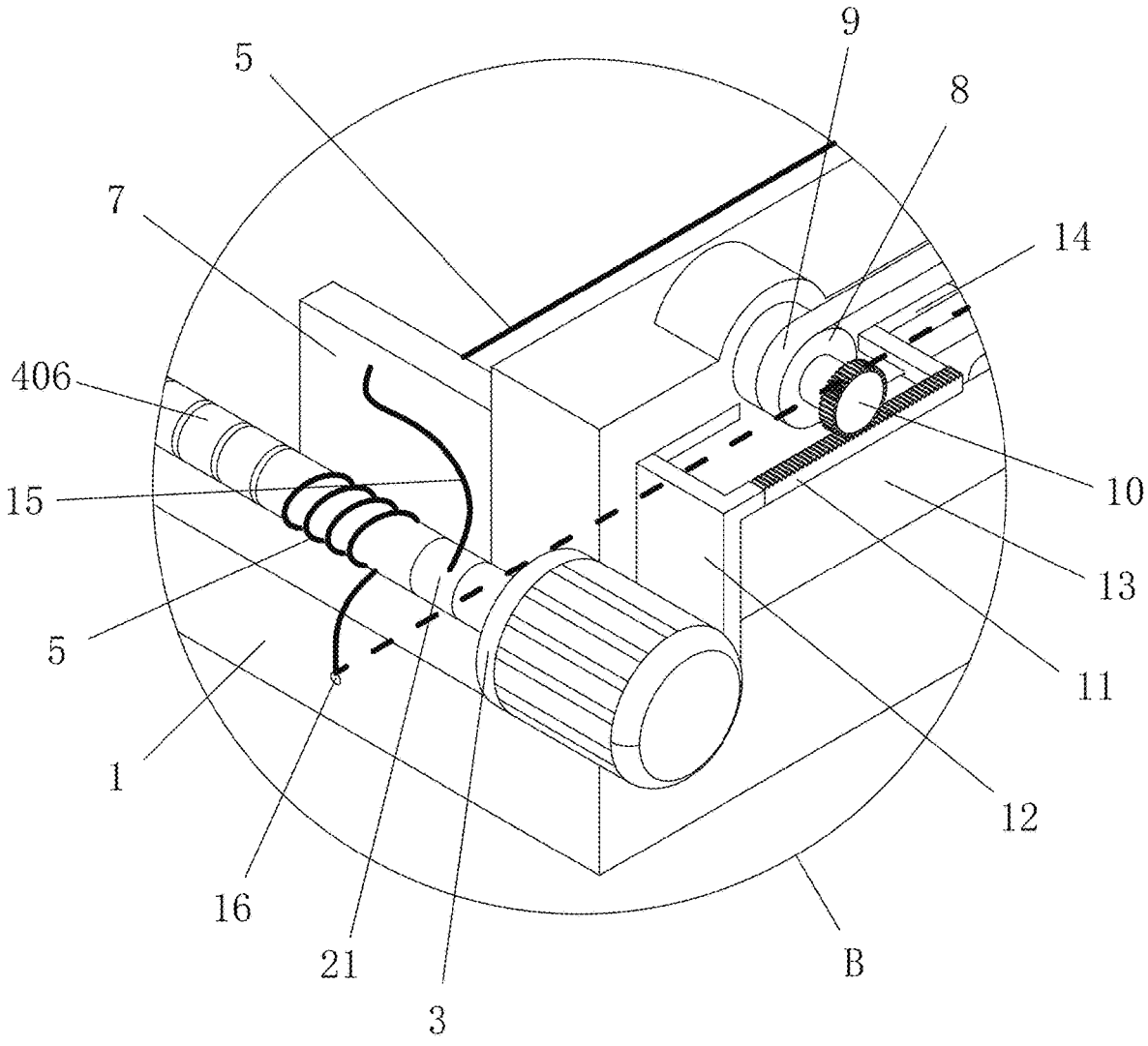
FIG. 4 is an enlarged view of B shown in FIG. 3.
Figure 5:
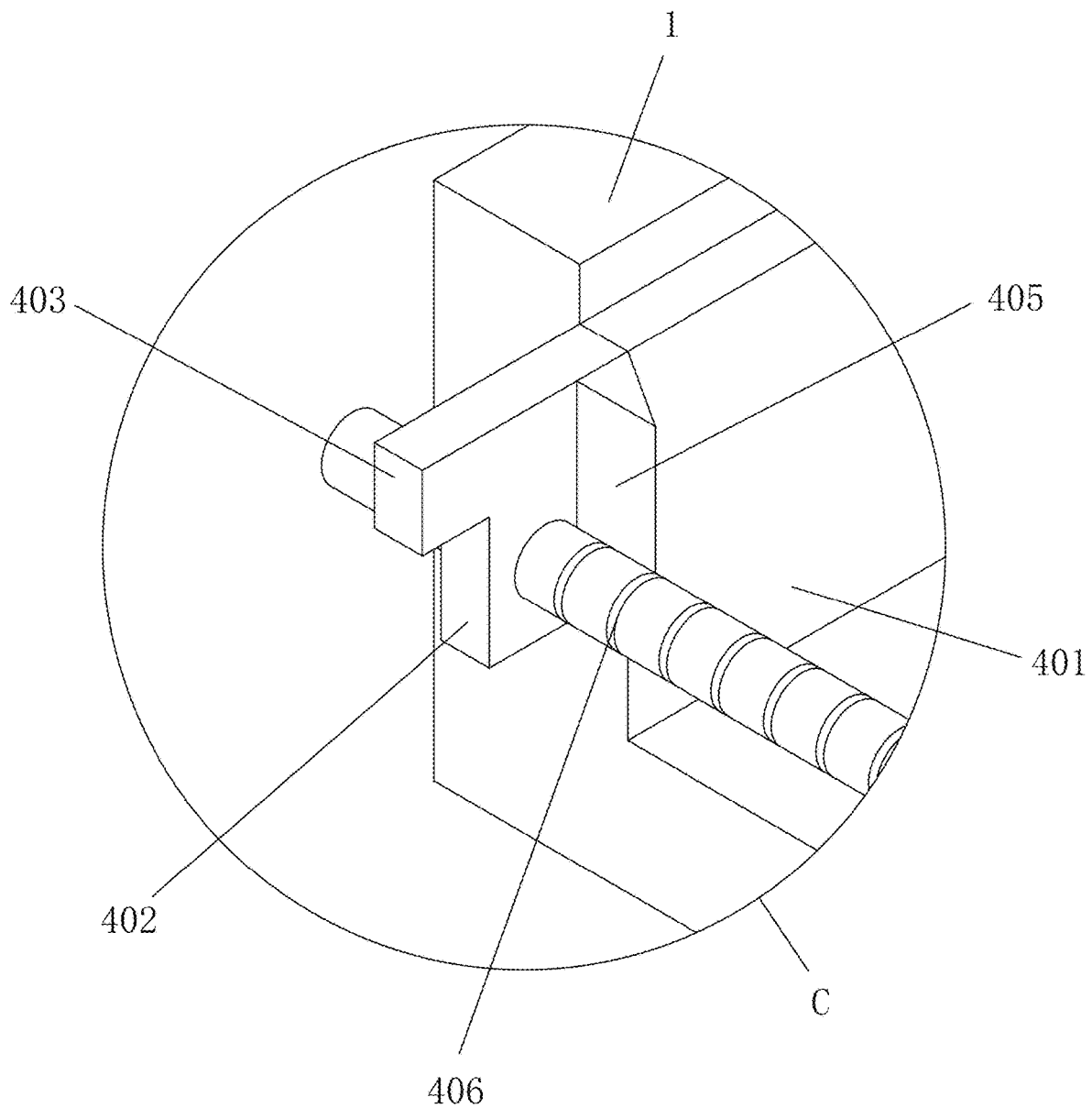
FIG. 5 is an enlarged view of C shown in FIG. 3.
Figure 6:
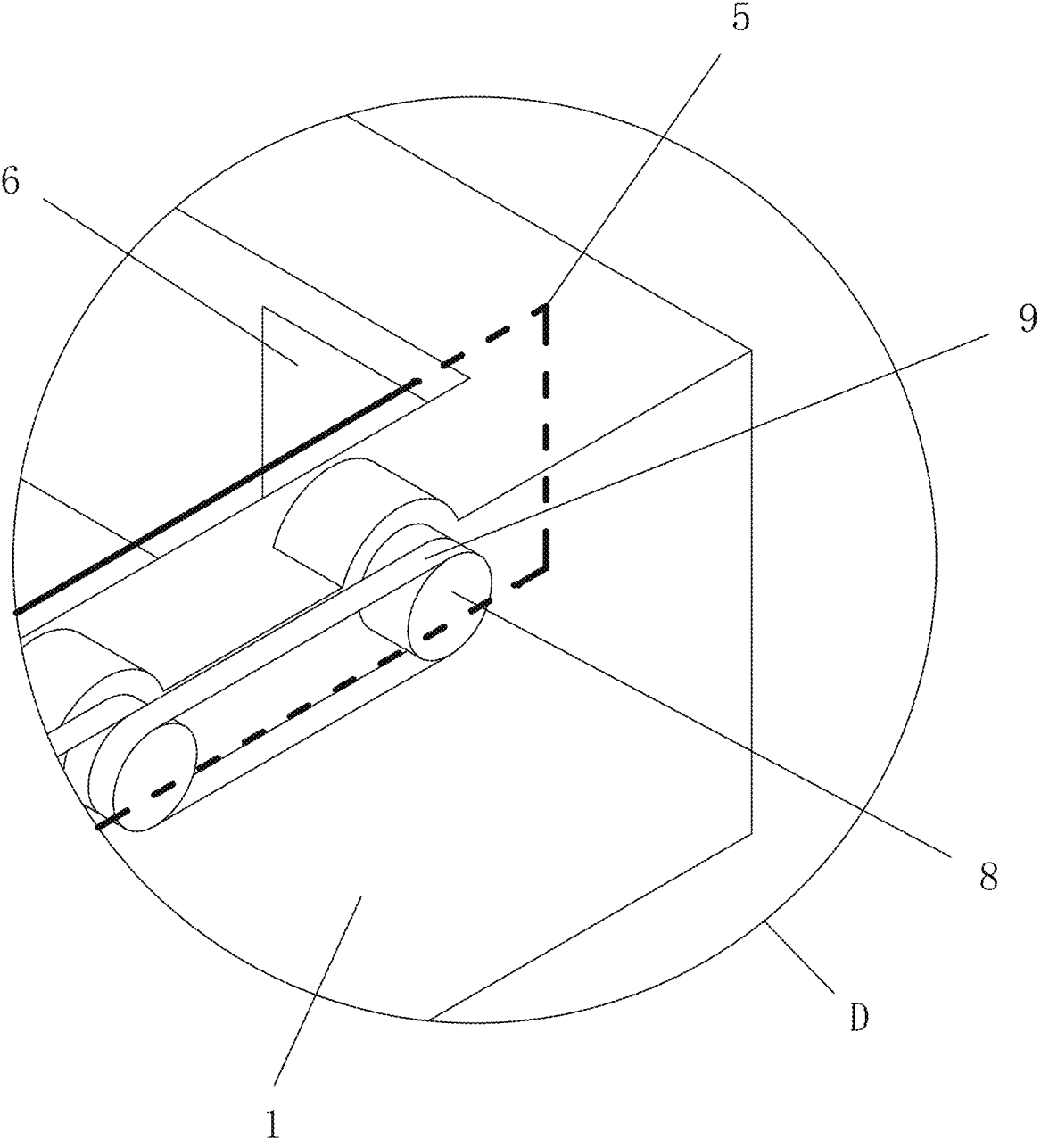
FIG. 6 is an enlarged view of D shown in FIG. 3.
Figure 7:
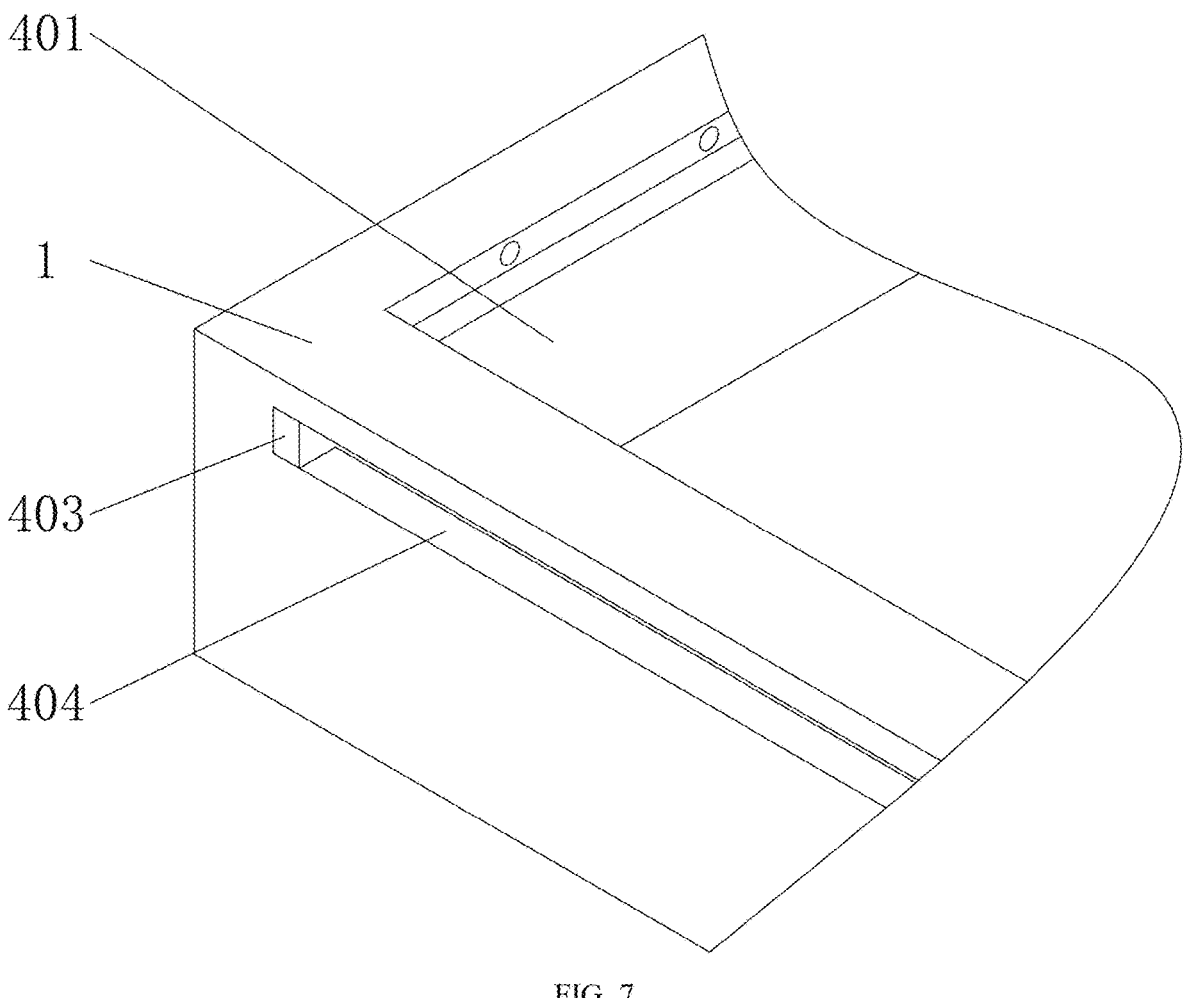
FIG. 7 is a structural diagram of the collection box and a limiting element that are connected according to the present disclosure.

In this embodiment, the gear 10 and the synchronous wheel 8 form a rotating structure with the collection box 1 through the rack 11. The activated carbon plate 2 forms a synchronous rotating structure with the adjacent activated carbon plate 2 through the synchronous wheel 8 and the synchronous belt 9. Through the synchronous belt 9, when one of the synchronous wheels 8 rotates, the synchronous wheels 8 at all positions rotate synchronously. As shown in FIG. 2, the synchronous belt 9 is provided in a staggered manner in the front-to-back direction, enabling the device to achieve efficient torque transmission.

In this embodiment, a position of the outlet 19 corresponds to a position of the discharge port 6, and a size of the discharge port 6 is identical to a size of the outlet 19. Through the corresponding positions of the discharge port 6 and the outlet 19, the device can stably discharge the laterally squeezed tilapia bait and feces, improving the convenience of device use.

Figure 8:
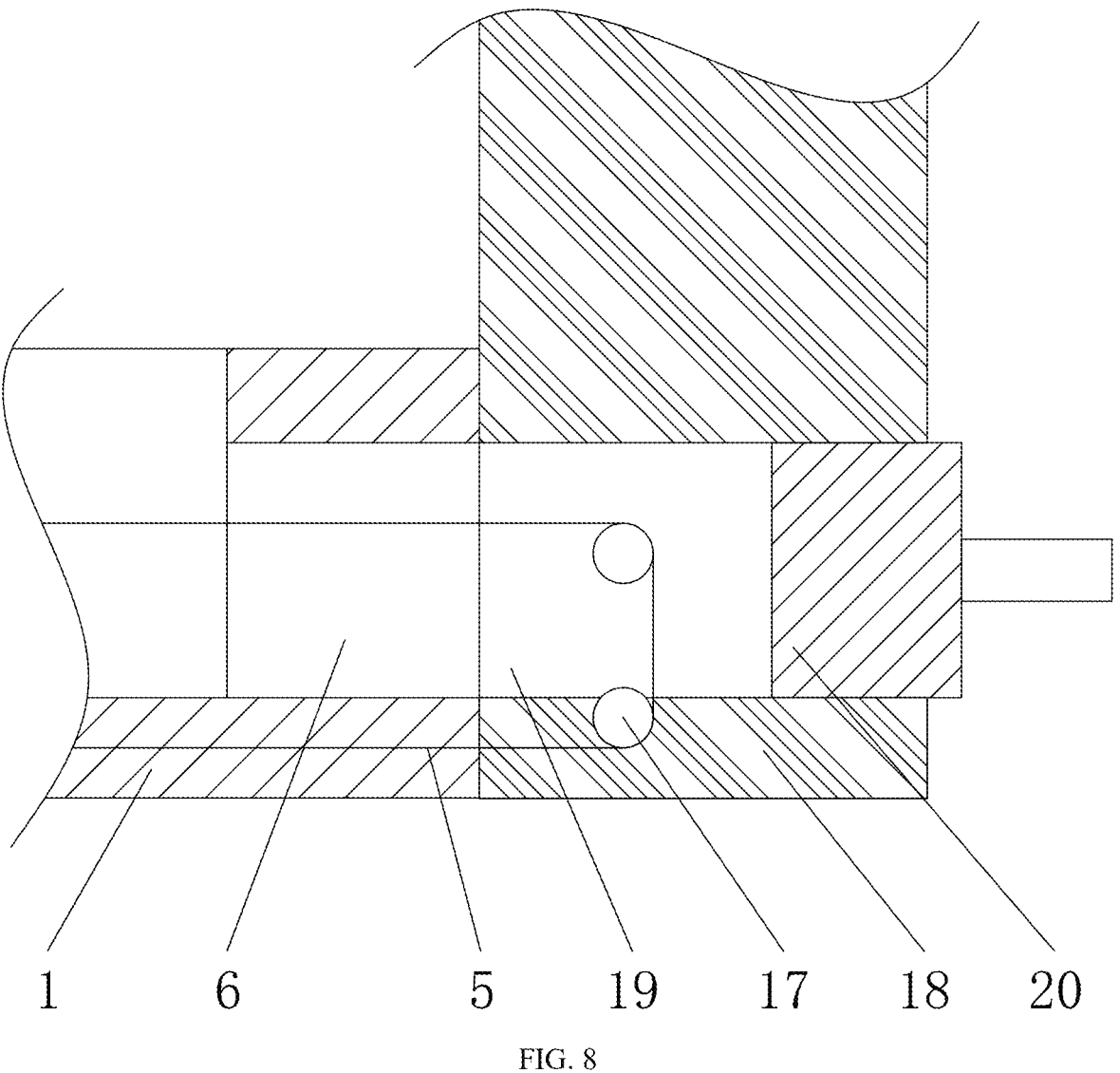
FIG. 8 is a structural diagram of a pond body and a guide wheel that are connected according to the present disclosure.

Specifically, the present disclosure provides a pond cleaning device and method for a tilapia farming pond. Firstly, as shown in FIGS. 1 and 8, the collection box 1 is placed at the bottom of the pond body 18. The activated carbon plates 2 evenly spaced on the surface of the collection box 1 collect the bait and feces produced during tilapia farming. As shown in FIGS. 1 to 6, the electric push rod 13 is shortened to drive the movable plate 12 to move to the right. The rack 11 drives the gear 10 to rotate counterclockwise, and the gear 10 drives the leftmost synchronous wheel 8 to rotate. The leftmost synchronous wheel 8 drives the leftmost activated carbon plate 2 to rotate 180° counterclockwise. When the leftmost activated carbon plate 2 rotates, the leftmost synchronous wheel 8 rotates, driving the synchronous belt 9 to rotate. The synchronous belt provided in a staggered manner in the front-to-back direction drives the synchronous wheels 8 at all positions to rotate synchronously, causing the activated carbon plates 2 of the device at all positions to rotate synchronously. Since each two adjacent activated carbon plates 2 of the device are separated by a gap, the activated carbon plates 2 at all positions rotate normally, thereby achieving cleaning of the tilapia feces and bait on the surfaces of the activated carbon plates 2. In addition, during the process of cleaning the bait, tilapia cannot enter the collection box 1, and the environment inside the pond body 18 will not be affected.

As shown in FIGS. 1 and 3 to 8, the waterproof motor 3 drives the screw rod 406 to rotate, causing the cleaning assembly 4 to work. The screw rod 406 rotates, driving the scraper sleeve 401 to move straight forward and backward under the limiting action of the slider 402, the limiting element 403, and the guide groove 404. When the scraper sleeve 401 moves forward, it cleans the inner wall of the collection box 1 and cleans the surfaces of the flipped activated carbon plates 2. When the activated carbon plates 2 move, the loose traction steel rope 5 is wound, such that the traction steel rope 5 pulls the push plate 7 to the right under the guidance of the rope channel 16 and the guide wheel 17. The traction steel rope 5 is loose in its initial state. Therefore, after the scraper sleeve 401 moves forward a certain distance, the push plate 7 moves to the right to thoroughly clean the tilapia feces and bait pushed forward. The tilapia feces and bait are pushed by the push plate 7 into the discharge port 6 and the outlet 19. Finally, the blanking cap 20 is removed of the device to perform squeezing cleaning on the tilapia feces and bait. After cleaning, the scraper sleeve 401 is reset, and the push plate 7 is reset through the elastic rope 15 on the rotating ring 21.

The above described are merely exemplary embodiments of the present disclosure, rather than to limit the present disclosure. Any modifications, equivalent substitutions, improvements, etc. made without departing from the spirit and principles of the present disclosure should fall within the protection scope of the present disclosure.

What is claimed is:

1. A cleaning device for a tilapia farming pond, comprising:

a collection box, wherein an outer side of the collection box is surrounded by a pond body;

activated carbon plates rotatably provided in the collection box;

a waterproof motor fixedly connected to a left side of the collection box;

a cleaning assembly provided at a back side of the collection box;

a rope channel provided in the collection box;

a traction steel rope provided in the rope channel, wherein:

an end of the traction steel rope is guided by a guide wheel and connected to a push plate;

the guide wheel is fixedly connected to the pond body; and the push plate is slidably connected to the collection box;

a discharge port provided at a right side of the collection box;

an outlet provided at a right side of the pond body;

a blanking cap provided in the outlet;

a front end of each of the activated carbon plates is fixedly connected to a synchronous wheel, wherein:

a front end of a leftmost synchronous wheel is fixedly connected to a gear;

a lower side of the gear is meshed with a rack;

a moving groove for the rack to move is provided in the collection box; and a left side of the rack is fixedly connected to a movable plate; and an electric push rod, wherein:

a lower right side of the movable plate is fixedly connected to the electric push rod;

the electric push rod is fixedly connected to the collection box and drives the moveable plate back and forth; and the synchronous wheel is connected to an adjacent synchronous wheel through a synchronous belt.

2. The cleaning device for the tilapia farming pond according to claim 1, wherein the activated carbon plates are evenly spaced in the collection box; and each two adjacent activated carbon plates are separated by a gap.

3. The cleaning device for the tilapia farming pond according to claim 1, wherein the cleaning assembly comprises a scraper sleeve attached to the back side of the collection box;

a left side of the scraper sleeve is fixedly connected to a slider; an upper left side of the slider is fixedly connected to a limiting element; a front end of the slider is fixedly connected to a wedge element; the left side of the collection box is provided with a guide groove for the limiting element to move; an output shaft of the waterproof motor is fixedly connected to a screw rod; and the screw rod is threaded with the limiting element and rotatably connected to the collection box.

4. The cleaning device for the tilapia farming pond according to claim 3, wherein the scraper sleeve is made of rubber; and the scraper sleeve, the slider, the limiting element, and the wedge element are integrated into a whole.

5. The cleaning device for the tilapia farming pond according to claim 3, wherein the scraper sleeve forms a first sliding structure with the collection box through the slider, the limiting element and the screw rod; and a front surface of the scraper sleeve is flush with front surfaces of the slider and the limiting element.

6. The cleaning device for the tilapia farming pond according to claim 3, wherein the wedge element is a right-angled triangular prism; a height of the wedge element is identical to a height of the slider; and an inclined surface of the wedge element is located at a side adjacent to the scraper sleeve.

7. The cleaning device for the tilapia farming pond according to claim 3, wherein the traction steel rope is winded around a surface of the screw rod; the push plate forms a second sliding structure with the collection box through the screw rod and the traction steel rope; a rotating ring is rotatably provided on the surface of the screw rod; a surface of the rotating ring is bolted with an elastic rope; and a right side of the elastic rope is connected to the push plate.

8. The cleaning device for the tilapia farming pond according to claim 1, wherein the gear and the synchronous wheel form a rotating structure with the collection box through the rack; and each of the activated carbon plates forms a synchronous rotating structure with an adjacent activated carbon plate through the synchronous wheel and the synchronous belt.

9. The cleaning device for the tilapia farming pond according to claim 1, wherein a position of the outlet corresponds to a position of the discharge port, and a size of the discharge port is identical to a size of the outlet.

10. A cleaning method for a tilapia farming pond, implemented by the cleaning device for the tilapia farming pond according to claim 1, and comprising the following steps:

S1: placing the collection box at a bottom of the pond body; collecting, by the activated carbon plates evenly spaced on a surface of the collection box, bait and feces produced during tilapia farming; and driving, by shortening the electric push rod, the movable plate to move to the right, such that the rack of the cleaning device drives the gear to rotate counterclockwise, the gear drives the leftmost synchronous wheel to rotate, and the leftmost synchronous wheel drives a leftmost activated carbon plate to rotate 180° counterclockwise;

S2: driving, by the synchronous belt, the synchronous wheels at all positions to rotate synchronously when the leftmost activated carbon plate rotates, such that the activated carbon plates of the cleaning device at all positions rotate synchronously, thereby achieving cleaning of tilapia feces and bait on the surfaces of the activated carbon plates, wherein during a process of cleaning the bait, tilapia is prevented from entering the collection box, ensuring safety of the cleaning device when in use; and S3: driving, by the waterproof motor, the cleaning assembly to work, allowing the cleaning assembly to clean the surfaces of the flipped activated carbon plates; winding the loose traction steel rope when the activated carbon plates of the cleaning device move, such that the traction steel rope pulls the push plate to the right under a guidance of the guide wheel; moving, after the scraper sleeve moves forward a predetermined distance, the push plate to the right to thoroughly clean the tilapia feces and bait pushed forward, such that the tilapia feces and bait are pushed into the discharge port and the outlet; and finally, removing the blanking cap of the cleaning device to perform squeezing cleaning on the tilapia feces and bait.

* * * * *